US011915602B2

(12) United States Patent
Ozturk et al.

(10) Patent No.: US 11,915,602 B2
(45) Date of Patent: Feb. 27, 2024

(54) DRONE DETECTION, CLASSIFICATION, TRACKING, AND THREAT EVALUATION SYSTEM EMPLOYING FIELD AND REMOTE IDENTIFICATION (ID) INFORMATION

(71) Applicant: North Carolina State University, Raleigh, NC (US)

(72) Inventors: Ender Ozturk, Raleigh, NC (US); Fatih Erden, Raleigh, NC (US); Haluk Celebi, Raleigh, NC (US); Ismail Guvenc, Raleigh, NC (US); Ozgur Ozdemir, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 253 days.

(21) Appl. No.: 17/387,140

(22) Filed: Jul. 28, 2021

(65) Prior Publication Data

US 2022/0036741 A1 Feb. 3, 2022

Related U.S. Application Data

(60) Provisional application No. 63/059,752, filed on Jul. 31, 2020.

(51) Int. Cl.
G08G 5/00 (2006.01)
G01S 7/41 (2006.01)
G06F 18/214 (2023.01)

(52) U.S. Cl.
CPC ............ *G08G 5/0082* (2013.01); *G01S 7/412* (2013.01); *G06F 18/214* (2023.01); *G08G 5/0013* (2013.01); *G08G 5/0069* (2013.01)

(58) Field of Classification Search
CPC ... G08G 5/0082; G08G 5/0013; G08G 5/0069
(Continued)

(56) References Cited

U.S. PATENT DOCUMENTS 9,622,133 B1 4/2017 Guvenc
9,715,009 B1 7/2017 Parker et al.
(Continued)

OTHER PUBLICATIONS

M. Ezuma, F. Erden, C. Kumar Anjinappa, O. Ozdemir and I. Guvenc, "Detection and Classification of UAVs Using RF Fingerprints in the Presence of Wi-Fi and Bluetooth Interference," in IEEE Open Journal of the Communications Society, vol. 1, pp. 60-76, 2020, doi: 10.1109/OJCOMS.2019.2955889. (Year: 2019).*
(Continued)

*Primary Examiner* — Isaac G Smith
(74) *Attorney, Agent, or Firm* — Thomas | Horstemeyer, LLP

(57) ABSTRACT

The present disclosure describes various embodiments of systems and methods of detecting, classifying, and making a threat assessment of an unmanned aerial vehicle (UAV). One such method comprises detecting a radio frequency (RF) signal; determining that the RF signal is generated from an unmanned aerial vehicle (UAV) based on the detected RF signal; classifying at least a make and model of the UAV based on the detected RF signal; sensing for a remote identification field data broadcasted by the UAV; receiving remote identification information of the UAV from a network database, if the network database is available; assessing a threat likelihood of the UAV based on joint processing of at least the RF signal based classification of the UAV and the received remote identification information of the UAV; and signaling an alert containing a description of the UAV and the threat if the UAV is assessed as a harmful threat.

20 Claims, 10 Drawing Sheets

(58) Field of Classification Search
USPC .......................................................... 701/120
See application file for complete search history.

(56) References Cited

U.S. PATENT DOCUMENTS

| | | | |
|---|---|---|---|
| 9,858,947 | B2 | 1/2018 | Hearing et al. |
| 9,986,440 | B2 | 5/2018 | Guvenc |
| 10,312,993 | B2 | 6/2019 | Rupasinghe et al. |
| 2006/0226949 | A1* | 10/2006 | Reene ................... G08C 19/28 340/5.25 |
| 2012/0039478 | A1* | 2/2012 | Yoshioka ................ G10L 25/90 381/56 |
| 2017/0094527 | A1* | 3/2017 | Shattil ...................... H04K 3/45 |
| 2020/0162489 | A1* | 5/2020 | Bar-Nahum ........... G06N 20/00 |
| 2021/0383270 | A1* | 12/2021 | Moro, Jr. ............. G08G 5/0013 |
| 2022/0078784 | A1* | 3/2022 | Yajnanarayana ..... H04W 24/02 |

OTHER PUBLICATIONS

M. Ritchie, F. Fioranelli, H. Griffiths, and B. Torvik, "Microdrone RCS analysis," in Proc. IEEE Radar Conf., Oct. 2015, pp. 452-456.
Federal Aviation Agency, "Proposed rule on remote identification of unmanned aircraft systems." [Online]. Available: https://www.federalregister.gov/documents/ 2019/12/31/2019-28100/remote-identification-of-unmanned-aircraft-systems.
M. Z. Anwar, Z. Kaleem, and A. Jamalipour, "Machine learning inspired sound-based amateur drone detection for public safety applications," IEEE Trans. Veh. Technol., vol. 68, No. 3, pp. 2526-2534, Jan. 2019.
V. Thai, W. Zhong, T. Pham, S. Alam, and V. Duong, "Detection, tracking and classification of aircraft and drones in digital towers using machine learning on motion patterns," in Proc. Integrated Commun. Navig. Surveillance Conf. (ICNS), Apr. 2019, pp. 1-8.
B. K. Kim, H. Kang, and S. Park, "Drone classification using convolutional neural networks with merged doppler images," IEEE Geosci. Remote Sens. Lett., vol. 14, No. 1, pp. 38-42, Jan. 2017.
H. Zhang, C. Cao, L. Xu, and T. A. Gulliver, "A UAV detection algorithm based on an artificial neural network," IEEE Access, vol. 6, pp. 24 720-24 728, May 2018.
Y. Seo, B. Jang, and S. Im, "Drone detection using convolutional neural networks with acoustic STFT features," in Proc. IEEE Int. Conf. Advanced Video Signal Based Surveillance (AVSS), Nov. 2018, pp. 1-6.
M. Saqib, S. Daud Khan, N. Sharma, and M. Blumenstein, "A study on detecting drones using deep convolutional neural networks," in Proc. IEEE Int. Conf. Advanced Video Signal Based Surveillance (AVSS), Aug. 2017, pp. 1-5.
A. Huizing, M. Heiligers, B. Dekker, J. de Wit, L. Cifola, and R. Harmanny, "Deep learning for classification of mini-UAVs using micro-doppler spectrograms in cognitive radar," IEEE Trans. Aerosp. Electron. Syst., vol. 34, No. 11, pp. 46-56, Nov. 2019.
B. Oh, X. Guo, F. Wan, K. Toh, and Z. Lin, "Micro-doppler mini-UAV classification using empirical-mode decomposition features," IEEE Geosci. Remote Sens. Lett., vol. 15, No. 2, pp. 227-231, Feb. 2018.
P. Molchanov, K. Egiazarian, J. Astola, R. I. A. Harmanny, and J. J. M. de Wit, "Classification of small UAVs and birds by micro-Doppler signatures," in Proc. European Radar Conf., Oct. 2013, pp. 172-175.
L. Wang, J. Tang, and Q. Liao, "A study on radar target detection based on deep neural networks," IEEE Sens. Letters, vol. 3, No. 3, pp. 1-4, Jan. 2019.
N. Regev, I. Yoffe, and D. Wulich, "Classification of single and multi propelled miniature drones using multilayer perceptron artificial neural network," in Proc. Int. Conf. on Radar Systems, Jan. 2017, pp. 1-5.
M. Ezuma, F. Erden, C. Kumar Anjinappa, O. Ozdemir, and I. Guvenc, "Detection and classification of UAVs using RF fingerprints in the presence of Wi-Fi and Bluetooth interference," IEEE Open J. Commun. Soc., vol. 1, pp. 60-76, Nov. 2019.
R. Olfati-Saber and J. S. Shamma, "Consensus Filters for Sensor Networks and Distributed Sensor Fusion," Proceedings of the 44th IEEE Conference on Decision and Control, Seville, Spain, 2005, pp. 6698-6703.
W. Li, Z. Wang, G. Wei, L. Ma, J. Hu and D. Ding, "A Survey on Multisensor Fusion and Consensus Filtering for Sensor Networks", Discrete Dynamics in Nature and Society, Oct. 2015, pp. 1026-0226.

\* cited by examiner

TABLE I
RELATED WORK ON DETECTION AND CLASSIFICATION OF DRONES USING ML TECHNIQUES.

| Literature | Source type | Features | Data process method | Classification | # of UAVs | Accuracy | Noise consideration |
|---|---|---|---|---|---|---|---|
| [1] | Drone RF signals | Slope, kurtosis, skewness | Several ML algorithms | ✗ | N/A | 96.36% | ✗ |
| [2] | Acoustic waves | MFCC and LPCC | SVM | ✗ | N/A | 96.7% | ✗ |
| [3] | Acoustic waves | STFT features | CNN | ✗ | N/A | 99.87% | ✗ |
| [4] | Camera images | RGB arrays | CNN for moving body detection and KNN for detection | ✗ | N/A | 93% | ✗ |
| [5] | Camera images | RGB arrays | CNN on ZF and VGG16 and Fast R-CNN | ✗ | N/A | 0.66 mAP | ✗ |
| [6] | Radar signals | micro-Doppler spectrogram | CNN and LSTM-RNN | ✓ | 5 | 97.7% | ✗ |
| [7] | Radar signals | micro-Doppler signature | CNN | ✓ | 6 | 94.7% | ✗ |
| [8] | Radar signals | micro-Doppler signatures through EMD | SVM | ✓ | 11 | >95% | ✗ |
| [9] | Radar signals | micro-Doppler signatures | SVM | ✓ | 11 | 95.4% | ✗ |
| [10] | Radar signals | Range doppler spectrum | CNN | ✗ | N/A | 99.5% and 54.2% for 0 dB various | ✓ |
| [11] | Radar signals | micro-Doppler signature | ANN on MLP | ✓ | 4 | | ✓ |
| [12] | Controller RF signals | Shape factor, kurtosis, variance | Several ML algorithms | ✓ | 17 | 98.13% and 40% for 0 dB SNR | ✓ |
| This work | Controller RF signals | Time-series signal and spectrogram RGB arrays | CNN | ✓ | 15 | 99.7% and 99.5% for 0 dB SNR | ✓ |

Literature Reference Legend for [1] to [12]: See FIG. 3B

FIG. 3A

Literature References:

[1] - H. Zhang, et al., "A UAV Detection Algorithm Based on an Artificial Neural Network," IEEE Access, Vol. 6, pp. 24 720–24 728 (May 2018)
[2] - M. Z. Anwar, et al., "Machine Learning Inspired Sound-Based Amateur Drone Detection for Public Safety Applications," IEEE Trans. Veh. Technol., Vol. 68, No. 3 (Jan. 2019), pp. 2526–2534
[3] - Y. Seo, et al. "Drone Detection using Convolutional Neural Networks with Acoustic STFT Features," in Proc. IEEE Int. Conf. Advanced Video Signal Based Surveillance (AVSS) (Nov. 2018), pp. 1–6
[4] - V. Thai, et al., "Detection, Tracking and Classification of Aircraft and Drones in Digital Towers using Machine Learning on Motion Patterns," in Proc. integrated Commun. Navig. Surveillance Conf. (ICNS) (Apr. 2019), pp. 1–8
[5] - M. Saqib, et al., "A Study on Detecting Drones using Deep Convolutional Neural Networks," in Proc. IEEE Int. Conf. Advanced Video Signal Based Surveillance (AVSS) (Aug. 2017), pp. 1–5
[6] - A. Huizing, et al., "Deep Learning for Classification of Mini-UAVs using Micro-Doppler Spectrograms in Cognitive Radar," IEEE Trans. Aerosp. Electron. Syst., Vol. 34, No. 11 (Nov. 2019), pp. 46–56
[7] - B. K. Kim, et al., "Drone Classification using Convolutional Neural Networks with Merged Doppler Images," IEEE Geosci. Remote Sens. Lett., Vol. 14, No. 1 (Jan. 2017), pp. 38–42
[8] - B. Oh, et al., "Micro-Doppler Mini-UAV Classification using Empirical-Mode Decomposition Features," IEEE Geosci. Remote Sens. Lett., Vol. 15, No. 2 (Feb. 2018), pp. 227–231
[9] - P. Molchanov, et al., "Classification of Small UAVs and Birds by Micro-Doppler Signatures," in Proc. European Radar Conf. (Oct. 2013), pp. 172–175
[10] - L. Wang, et al., "A Study on Radar Target Detection Based on Deep Neural Networks," IEEE Sens. Letters, Vol. 3, No. 3 (Jan. 2019), pp. 1–4
[11] - N. Regev, et al., "Classification of Single and Multi Propelled Miniature Drones using Multilayer Perceptron Artificial Neural Network," in Proc. Int. Conf. on Radar Systems (Jan. 2017), pp. 1–5
[12] - M. Ezuma, et al., "Detection and Classification of UAVs using RF Fingerprints in the Presence of Wi-Fi and Bluetooth Interference," IEEE Open J. Commun. Soc., Vol. 1 (Nov. 2019), pp. 60–76

FIG. 3B

TABLE II
Optimum Set of Hyperparameters for Time-Series and Spectrogram Images.

| Input type | SNR (dB) | Cut-off level ($V^2/Hz$) | Optimizer | Batch size | Validation accuracy (%) |
|---|---|---|---|---|---|
| Time ser. | 30 | N/A | SGD | 4 | 99.7 |
| Time ser. | 20 | N/A | Adagrad | 4 | 96.5 |
| Time ser. | 10 | N/A | Nadam | 16 | 81.6 |
| Time ser. | 5 | N/A | Nadam | 1 | 65.3 |
| Time ser. | 0 | N/A | Adagrad | 1 | 50.1 |
| Spec. | 30 | -100 | Adamax | 8 | 99.7 |
| Spec. | 20 | -90 | Nadam | 2 | 99.7 |
| Spec. | 15 | -10 | Adam | 32 | 100.0 |
| Spec. | 10 | -10 | Nadam | 2 | 100.0 |
| Spec. | 5 | -10 | Adam | 4 | 99.7 |
| Spec. | 0 | -10 | Nadam | 8 | 99.5 |
| Spec. | -5 | -20 | RMSProp | 8 | 99.5 |
| Spec. | -10 | -15 | Nadam | 16 | 92.0 |
| Spec. | Merged | -10 | SGD | 1 | 98.8 |
| Spec.* | Merged | -10 | SGD | 1 | 96.9 |

*Refers to the set of images created by assuming SNR levels different than the ones used to train the merged model.

FIG. 7

DRONE DETECTION, CLASSIFICATION, TRACKING, AND THREAT EVALUATION SYSTEM EMPLOYING FIELD AND REMOTE IDENTIFICATION (ID) INFORMATION

CROSS-REFERENCE TO RELATED APPLICATION

This application claims priority to U.S. provisional application entitled, "Drone Detection, Classification, Tracking, and Threat Evaluation System Employing Field and Remote Identification (ID) Information," having Ser. No. 63/059,752, filed Jul. 31, 2020, which is entirely incorporated herein by reference.

STATEMENT REGARDING FEDERALLY SPONSORED RESEARCH OR DEVELOPMENT

This invention was made with government support under grant number NNX17AJ94A awarded by The National Aeronautics and Space Administration (NASA). The government has certain rights in the invention.

BACKGROUND

Unmanned aerial vehicles (UAVs) or drones have recently gained a great deal of interest among researchers due to unrivaled commercial opportunities in various fields, such as wireless communications, logistics, delivery, search and rescue, smart agriculture, surveillance, defense industries, and more. In addition, the recent COVID-19 outbreak revealed the importance of remote operations in every aspect of life. Therefore, it is expected that there will be a further outburst of UAV-related applications and research.

Innate advantages of UAVs that make them popular, such as ease of operation and low cost, could also be considered as major disadvantages particularly due to security concerns. There have been many criminal activities recently with drones involved, and their small sizes make drones difficult to detect, classify, and interdict them. In this regard, the Federal Aviation Agency (FAA) of the United States recently announced a Proposed Rule that would require remote identification of unmanned aircraft systems to address safety and security concerns. Although integrating UAVs with the national airspace remains an issue for aviation agencies, we will see a vast number of drones in the air soon. Major application areas will be shipping, surveillance, security, weather forecast, disaster management, structure and geographical mapping and many more. With the increase of drone usage in every aspect of daily life, other issues will arise, e.g., monitoring, friend or foe classification, and localization. The FAA's upcoming regulation obliges every drone to stay online during flight and report all identification information. This obligation opens a new dimension to counter the drone market.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 3A-3B show a table (Table I) of representative work on UAV (unmanned aerial vehicle) detection and classification in the literature along with specifications of the number of UAVs considered, classification accuracy, and noise considerations.

FIG. 7 shows a table (Table II) that summarizes the key optimum parameters for exemplary models with time-series and spectrogram images along with showing the classification accuracy.

DETAILED DESCRIPTION

Figure 1:
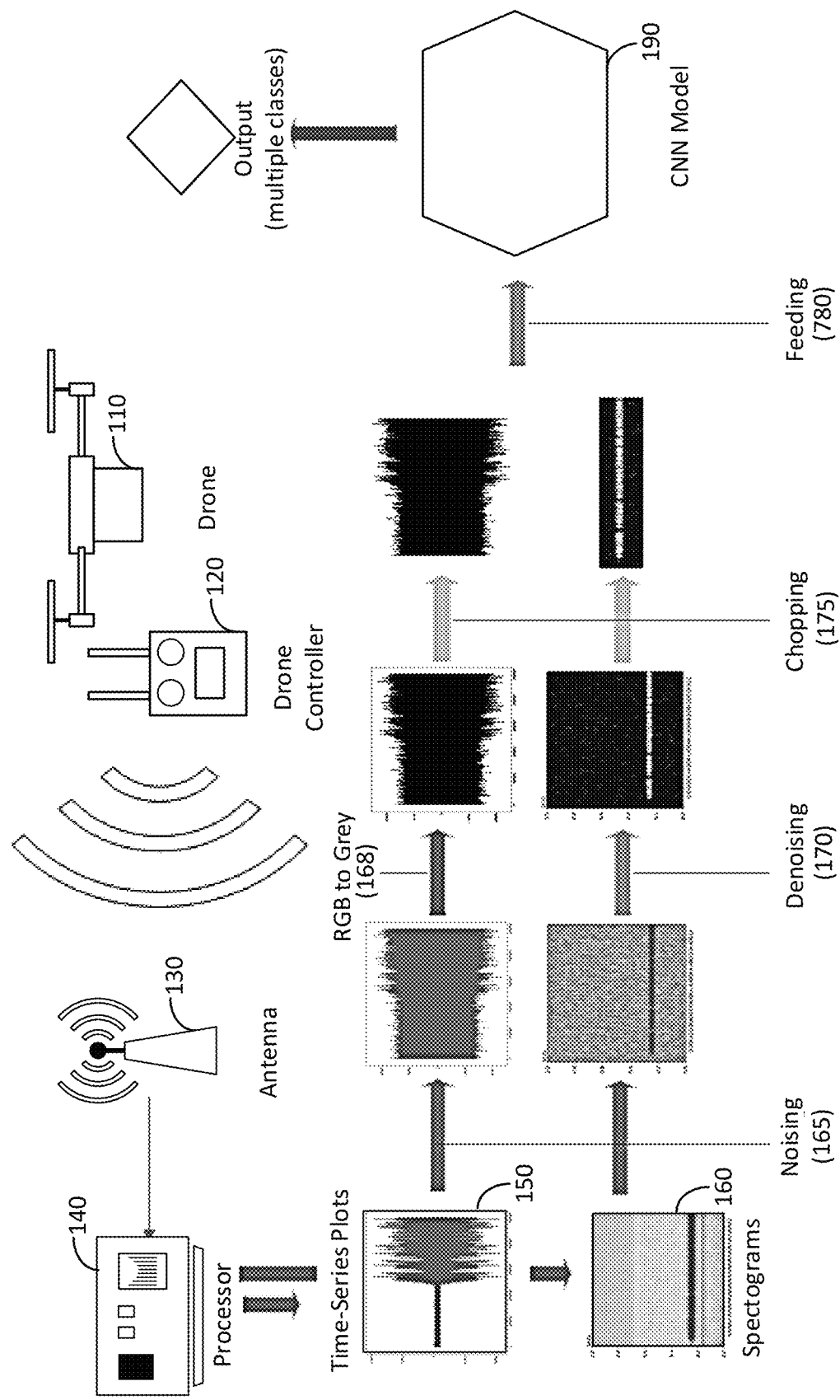
FIG. 1 shows an exemplary workflow of a classification method in accordance with various embodiments of the present disclosure.

The present disclosure describes various embodiments of systems, apparatuses, and methods of detecting, classifying, and making a threat assessment of an unmanned aerial vehicle (UAV). In one embodiment, an exemplary framework for such a system involves operations related to passively sensing radio frequency (RF) signals from UAV controllers and the UAV itself, receiving remote identification (ID) field data broadcasted by the UAV, processing the sensed RF signals, classifying or determining the make & model, among other information (such as location, speed/velocity, direction, pilot identification (e.g., based on having certain flying pattern), etc.) of the UAV based on the detected RF signal, receiving remote identification (ID) information from a network database (e.g., Internet database), if available, processing the RF signal based classification & remote ID information jointly to make a decision about threat likelihood of the UAV, and/or taking user-defined actions depending on the outcome of the threat assessment. Accordingly, the UAV may be required to broadcast remote ID field data directly from the UAV while also transmitting that same remote ID information through a network connection (e.g., Internet connection) to a computer platform of a regulatory body. Accordingly, remote ID field data and the remote ID information may include a UAV's serial number, session ID, speed/velocity of the UAV, a time stamp, a current location (e.g., the latitude, longitude, and altitude of the drone and controller), takeoff location, etc.

In various embodiments, an exemplary apparatus or system can surveil the environment continuously to sense nearby UAVs or drones. Such a system can first detect an RF signal and decide if the RF signal is generated from a UAV or not. In case the RF signal is determined to be from a UAV, the system can determine the make and model of the UAV and/or other information. Further, such a system or apparatus may be connected to a regulatory (e.g., Federal Aviation Agency (FAA)) network database (if the database is available) through an application programming interface (API) to retrieve remote ID information from flying UAVs and compare that information with remote ID field data that is received from a local UAV. For example, the remote ID field data may be intentionally tampered and broadcasted to evade detection and localization with the wrong serial number and/or other information (e.g., location) that does not match with the remote ID field information from an aviation regulatory network database (assuming that the network database is available) that is also associated with the same serial number. Thus, a combination of the remote ID comparison and the classification of the RF signal may be used to make a threat evaluation or assessment. In making this assessment, a type of threat may be determined, such as whether the harmful threat is related to aerial vehicle corridors or particular buildings (e.g., a stadium, convention center, etc.). Necessary actions can be taken according to user predefined use cases, such as signaling an alert with a description of the threat (e.g., description of UAV and potential target location, such as aerial vehicle corridors or particular buildings (e.g., a stadium, convention center, etc.)) if the unmanned aerial vehicle is assessed as a harmful threat. Accordingly, alert signaling can include, but is not limited to, creating smart phone warnings, sending short messages, creating appropriate inputs for already deployed smart home systems, triggering alarm systems, making 911 calls, etc. In various embodiments, such a system or apparatus may keep a "hot list" of the most frequently detected UAVs as a reference to make quick threat assessments.

One of the unique features of the present disclosure is a classification process that works with really high accuracies under low signal-to-noise ratio (SNR) regimes. An exemplary classification process uses artificial intelligence techniques involving convolutional neural networks (CNNs), which are proven to give good results on image classification, trained on radio frequency (RF) spectrograms of different off-the-shelf UAV controller RF signals. In some embodiments, an exemplary CNN may also be trained on RF time-series signal images or plots. An exemplary workflow of a classification method is shown in FIG. 1.

In an exemplary method, the signal from the UAV 110 and/or the controller 120 (e.g., at 2.4 GHz and 5 GHz control and payload signals) is sampled at a wireless sensor having an receiving antenna 130 and stored as a one-dimensional array by a data processor 140. As discussed, an exemplary classification process may be trained on RF time-series signal images/plots 150 or spectrograms 160s. For example, using these samples, a spectrogram 160 may be generated, by the data processor 140, with a certain bandwidth and time duration, where the spectrogram 160 provides a visual representation of the spectrum of frequencies of the signal as it varies with time. In general, spectrograms reflect the power spectral densities of the signals. Since color depth preserves distinctive information, the spectrogram images are kept in an RGB format. However, this is not necessarily the case for time-series plots. In order to decrease the complexity, time-series signal images may be converted (168) to greyscale. However, there is the practical problem of noise 165 being present in the acquired RF signals and resulting time-series plots or spectrogram images. Thus, during training, noisy data can generated by adding artificial white noise to the original data.

To enhance the accuracy of classification of the RF signal, spectrograms 160 are denoised (170) by the data processor 140. In order to denoise (170) the spectrogram images, the level of spectral density that appears on the spectrogram 160 is tuned. That is, spectral densities lower than a cut-off threshold ("denoising threshold") on the spectrogram 160 are filtered out, below which the pixels are represented by the coolest color, and the rest is remapped to the spectrogram to let the features at the high density parts come forward. The denoising threshold is important for the classification accuracy, since under-denoising does not clear enough noise and over-denoising wipes out vital information together with the noise, both yielding to decreased classification accuracy. In various embodiments, the time-series plots or the spectrogram images are chopped (175) appropriately to remove the unnecessary parts to reduce the file sizes, which will speed up the classification process. In an exemplary implementation, spectrogram and time-series signal images have the sizes of (90×385×3) and (779×769×1) before feeding (180) a CNN classification model 190, respectively, that is configured to output a classification (e.g., UAV make and model, etc.) of the detected UAV drone that generated the RF signal.

Figure 2:
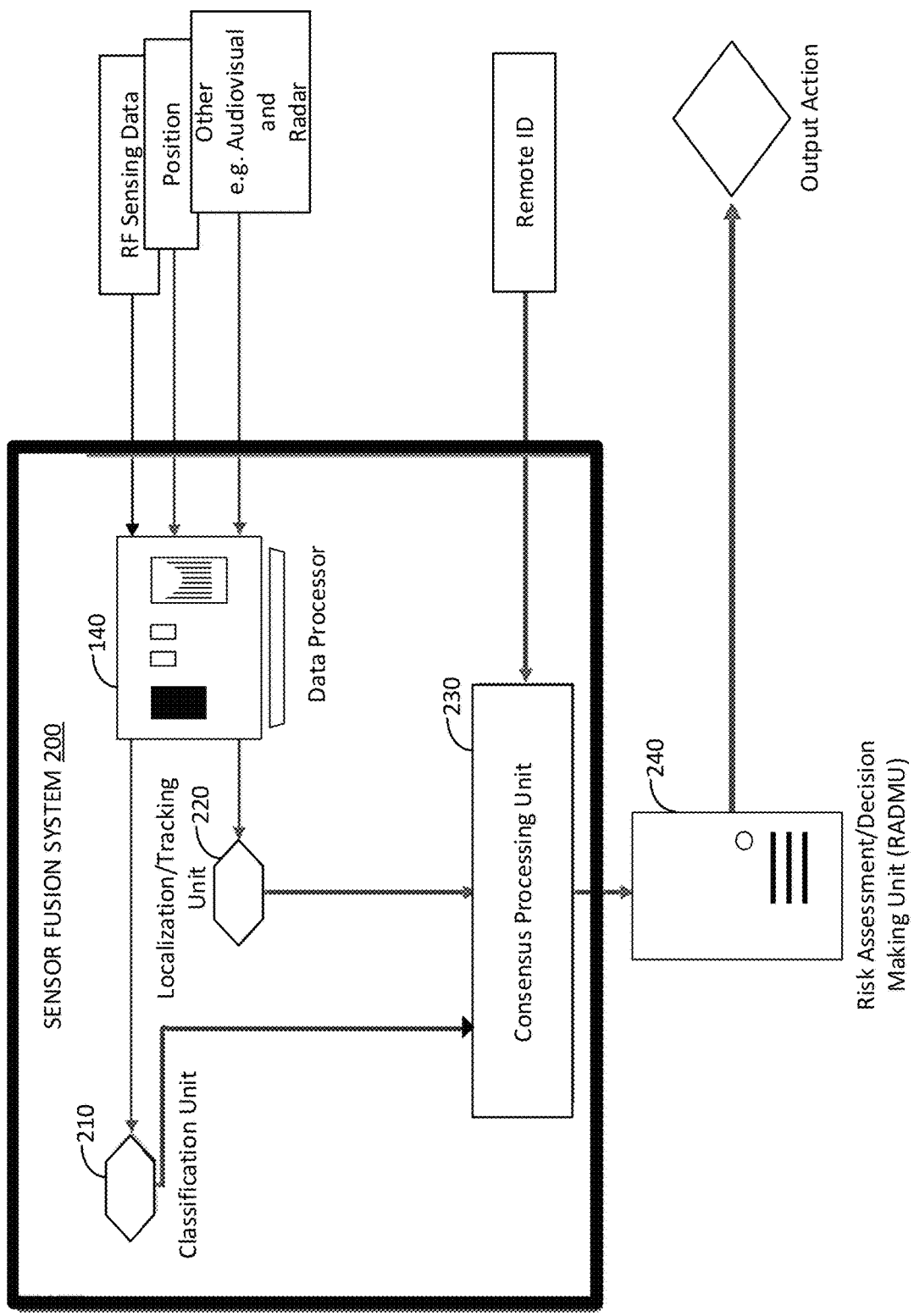
FIG. 2 shows exemplary system components and data inputs/outputs in accordance with various embodiments of the present disclosure.

Referring now to FIG. 2, exemplary system components and data inputs/outputs are presented. In various embodiments, an exemplary CNN classification model 190 has multiple inputs: RF signals of the controller and/or the UAV collected by an omnidirectional dipole antenna connected to an SDR (software defined radio); location information taken from a global positioning system (GPS) collected by a GPS unit; remote ID information provided by a regulatory body such as the FAA (Federal Aviation Agency), which may be collected either by WiFi or mobile internet; possibly other data (e.g., audio data collected by an array of microphones, visual data collected by high resolution cameras, radar echo signals in terms of RCS (radar cross section), and micro-Doppler signatures collected by a Ku-band radar). Accordingly, one or more of the input data may be fed to a sensor fusion system 200 for preprocessing purposes. Another unique feature of an exemplary system 200 is the ability to jointly process field and remote ID information taken via the Internet (or other external network) to do a threat assessment. Thus, in various embodiments, the threat likelihood of the UAV can be assessed utilizing multiple data sources comprising audiovisual and radar signals gathered from the field in addition to the RF signals and the received remote identification information of the UAV.

Sensor fusion is the ability to bring together inputs from multiple sources to form a single model to accurately balance the strengths and weaknesses of the different sensors/sources. In an exemplary sensor fusion system, different inputs can pass through a data processor 140 for preprocessing the data to have the data ready for classification/localization/tracking, in which the data fusion process can be, but is not limited to only being, performed via cloud or edge computing. Preprocessed data can be fed to a classification processing unit 210 (e.g., that implements a CNN classification model 190) and localization/tracking unit 220. Outputs of classification processing unit 210 and localization/tracking unit 220, remote ID, global positioning system (GPS) location and other relevant information from the data processor 140 can be fed into a consensus processing unit 230.

An exemplary consensus routine or process performed by the classification processing unit 210 assesses the strengths and weaknesses of different inputs and makes the data ready for risk management. In particular, the consensus process can be used to achieve agreement on a single data value among distributed processes or systems. Such consensus processes are designed to achieve reliability in a network involving multiple unreliable or partly reliable nodes. To accommodate this reality, consensus processes necessarily assume that some processes and systems will be unavailable and that some communications will be lost. For example, it may be that the remote ID link is jammed or there may be too long of a delay, or an intentional/unintentional wrong. Examples of various consensus algorithms implementations can be found in the works of Olfati-Saber, et al. and Li, et al. See R. Olfati-Saber and J. S. Shamma, "Consensus Filters for Sensor Networks and Distributed Sensor Fusion," Proceedings of the 44th IEEE Conference on Decision and Control, Seville, Spain, pp. 6698-6703 (2005) and W. Li, Z. Wang, G. Wei, L. Ma, J. Hu and D. Ding, "A Survey on Multisensor Fusion and Consensus Filtering for Sensor Networks", Discrete Dynamics in Nature and Society, pp 1026-0226 (October 2015).

An exemplary Risk Assessment/Decision Making Unit (RADMU) 240 accepts the classification and/or remote ID information provided by the consensus processing unit 230 and makes a threat assessment decision and initiate resulting action(s). Such a decision making process may be partly configurable by user defined options. In various embodiments, the RADMU 240 may be aided by a "hot list" of available actions to make quick decisions. Possible outcomes of the RADMU unit 240 include, but are not limited, to creating smart phone warnings, sending short messages, creating appropriate inputs for already deployed smart home systems, triggering alarm systems, making 911 calls, triggering warnings for drone pilots who may be impacted from a nearby unauthorized UAV, triggering warnings for commercial and government departments who may be impacted from unauthorized UAVs, etc.

With respect to RF sensing data acquired by the sensor fusion system, the present disclosure investigates the problem of classification of unmanned aerial vehicles (UAVs) at the low signal-to-noise ratio (SNR) regime. In various embodiments, the sensor fusion system uses convolutional neural networks (CNNs) trained with radio frequency (RF) time-series signal images and/or the spectrograms of, but not limited to, 15 different off-the-shelf UAV controller RF signals. When using time-series signal images, the CNN extracts features from the signal transient and envelope. As the SNR decreases, this approach fails dramatically, since the information in the signal transient is lost in the noise, and the envelope is distorted heavily. In contrast to time-series signal images, spectrograms filter out the noise at off-frequency areas, which increases the overall performance when compared with the time-series signals-based models. To further increase the classification accuracy, some embodiments of the sensor fusion system apply denoising to spectrogram images. By creating a single model using spectrogram images of noisy signals and tuning the model parameters, a classification accuracy can be achieved varying from 92% to 100% for an SNR range from −10 dB to 30 dB, which significantly outperforms existing approaches to the best of the inventors' knowledge.

There are efforts in the existing literature for detection and classification of UAVs using various techniques. Here, the term detection is used as a special case of classification that has two classes (i.e., drone/non-drone). Techniques used to achieve these tasks can be categorized based on the type of the data being captured (e.g., radar signals, UAV or controller RF signals, acoustic data, or camera images), features extracted from the data (e.g., RF fingerprints, spectrogram images, etc.), and the machine learning (ML) algorithms used for classification. Acoustic sensors do not require line-of-sight (LOS); however, they suffer from short range, since UAVs can operate very quietly, and data gathered using microphone systems are prone to wind and environmental clutter. On the other hand, a LOS vision under daylight is essential for techniques that utilize camera images. Using thermal or laser-based cameras to overcome this issue increases the cost significantly.

Radar signals are immune to environmental issues, such as acoustic noise and fog. However, UAVs are small devices with tiny propellers which make it hard to perceive and distinguish them from each other by most radars. A high frequency wideband radar could be used to deal with these difficulties; however, such radars are considerably expensive and suffer from high path loss. RF signals of either UAVs themselves or controllers are mostly at sub-6 GHz band and share unlicensed Wi-Fi bands. As a result of this, equipment to capture RF signals are affordable, but on the downside, these techniques require special attention for noise handling. In addition to no LOS being required, RF signal capturing techniques are immune to many issues that acoustic and visual techniques suffer from.

RF signals can be used for classification of the UAVs, either directly or indirectly after some processing. In the works of Zhang, et al. and Ezuma, et al., time domain statistical properties of the RF signal, such as slope, kurtosis, skewness, shape factor and variance, are used as features along with different ML algorithms to detect and classify UAVs. See H. Zhang, C. Cao, L. Xu, and T. A. Gulliver, "A UAV Detection Algorithm Based on an Artificial Neural Network," IEEE Access, vol. 6, pp. 24 720-24 728 (May 2018) and M. Ezuma, F. Erden, C. Kumar Anjinappa, O. Ozdemir, and I. Guvenc, "Detection and Classification of UAVs using RF Fingerprints in the Presence of Wi-Fi and Bluetooth Interference," IEEE Open J. Commun. Soc., vol. 1, pp. 60-76 (November 2019). However, since unlicensed bands are heavily employed, time domain information suffer from low signal-to-noise ratio (SNR).

A frequency domain representation of RF signals can also be used to distinguish between different types of UAVs. Transforming RF signals into the frequency domain filters out the out-of-band noise and helps improve classification accuracy up to a certain extent. In the literature, generally, spectrograms are used to represent spectral information and mostly, studies that use radar signals utilize spectrograms to detect and classify UAVs. There are limited research studies that focuses on spectrograms of RF signals in the context of UAV detection/classification.

In Table I (of FIGS. 3A-3B), the related representative work on UAV detection and classification in the literature is shown along with specifications of the number of UAVs considered, classification accuracy, and noise considerations. Classification accuracy should be considered together with the number of UAVs as it gets harder to classify UAVs with high accuracy as the number of classes increases. For studies which have X marks on the Classification column of the table, exemplary models performed only detection which means there are only two classes. The table also provides the information about whether the work considers noise or not, to better emphasize the achievement of the techniques of the present disclosure.

In various embodiments of the present disclosure, a convolutional neural network (CNN)-based classifier is developed using both time-series signal images and spectrogram images of 15 different drone controller RF signals to classify drones of different makes and models. The practical problem of classifying drones in noisy environments is addressed by considering a range of SNR levels from −10 dB to 30 dB. Noisy data is generated by adding artificial white noise to the original data. While using spectrogram images to train the CNN classification models, the present disclosure implements a denoising method to improve the classification accuracy for low SNRs, in which the spectral density level that appears on the spectrogram image is tuned and spectral densities lower than a cut-off threshold are filtered out. Accordingly, the pixels where the spectral density is below the cut-off threshold are represented by the coolest color in the color map used. Then, the rest are remapped to let the possible features at the high density parts come forward. In various embodiments, multiple datasets are created, each of which includes a set of RF signals from all the UAV controllers and with a particular SNR level, and a single model for each dataset (or SNR level) is trained. One can use these models if it is possible to measure the SNR of the received signal in real time. To obtain reliable results with this approach, it is also required to train models for a considerably wide range of SNR levels. To avoid this burden and the requirement of measuring the SNR in real time, in various embodiments, a single model is created using a merged dataset that includes spectrograms of RF signals with eight different SNR levels.

To evaluate the single CNN classification model, this model is tested with an unseen dataset generated from RF signals of SNR levels different than the ones used in training. For the case where we performed training and testing within the same dataset of a particular SNR value, an accuracy of 92.0% is achieved at −10 dB, 99.5% at −5 dB, and 100% at and above 10 dB. On the other hand, when a single model is trained with spectrograms having various levels of SNRs ranging from −10 dB to 30 dB, a classification accuracy of 98.8% is achieved. In addition, the single model yields 96.9% classification accuracy for the dataset consisting of RF signals with unseen SNR values. Thus, an exemplary classifier in accordance with embodiments of the present disclosure highly outperforms previously published work, especially at low SNRs.

Next, for experimental analysis, the dataset from the work of Ezuma, et al. is used as provided in the following paper: M. Ezuma, F. Erden, C. Kumar Anjinappa, O. Ozdemir, and I. Guvenc, "Detection and Classification of UAVs using RF Fingerprints in the Presence of Wi-Fi and Bluetooth Interference," IEEE Open J. Commun. Soc., vol. 1, pp. 60-76 (November 2019). This dataset consists of RF signals from 15 different off-the-shelf UAV controllers, where the RF signals were captured using an ultra-wideband (UWB) antenna and an oscilloscope with a sampling rate of 20 Gsa/s. The total number of samples in each signal is $5 \times 10^6$, which corresponds to a duration of 250 μs. The time-series RF signal of a controller is stored in a 1-D array of length 5 million, and time-series images are acquired by plotting these 1-D arrays. Spectrogram images are created calculating power spectral densities of the signals using Welch's average periodogram method, where a Hanning window of size 128 with 16 overlap samples is used. Then, the calculated densities are mapped to a color scale, in which a color map is used that spans the whole color space evenly, i.e., passes through all the colors in the visible range, which increases the accuracy of the CNN significantly.

Figure 4:
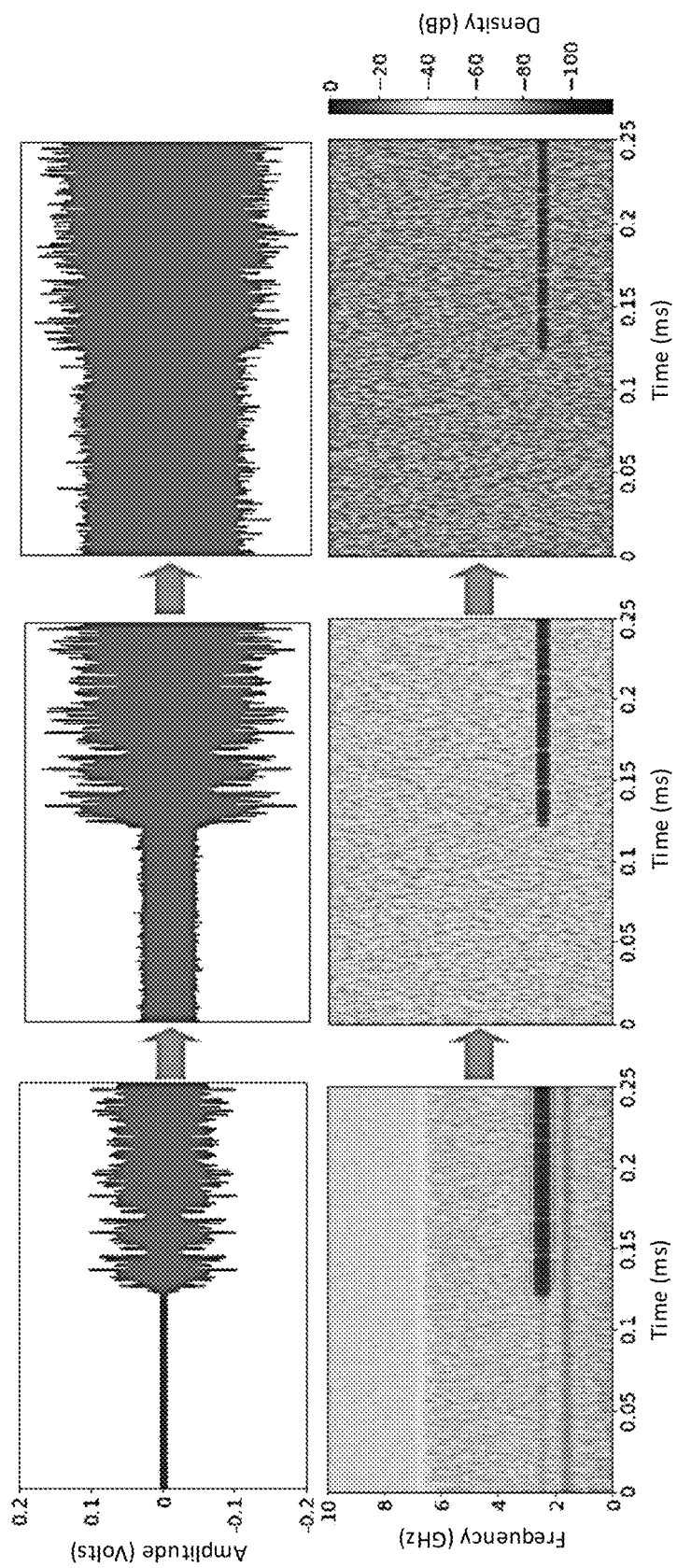
FIG. 4 shows plots of an artificially noised controller signal of a UAV (DJI Inspire 1 Pro) for different signal-to-noise ratios (SNRs) (from left to right): 30 dB, 15 dB, and 0 dB.

Assuming a fixed environmental noise, the SNR level of an RF signal decreases as the source gets farther away from the receiving antenna. Thus, classifying UAVs with high accuracy under low SNR regimes yields to increased range of UAV detection systems. Therefore, the present disclosure presents a method that can identify UAVs even at very low SNRs. For data collected in a lab environment, the noise is stable and the same for all measurements. Correspondingly, to train and test exemplary models for noisy signals, white Gaussian noise can be added to the raw data, and then the corresponding time-series and/or spectrogram images can be generated (as illustrated in FIG. 1). While generating noisy signals, in some embodiments, Higuchi's fractal dimension method may be used to find the point where the RF signal begins, and this point may be used to distinguish between the noise and the RF signal and calculate their actual power. Finally, an appropriate amount of random noise can be added to the whole signal to set the signal to a designated SNR level. Subject to the type of the controller, the original data may have an SNR around 30 dB. Accordingly, a set of artificially noised time-series plots and spectrograms are given in FIG. 4 for a DJI Inspire 1 Pro UAV for different SNRs (from left to right): 30 dB, 15 dB, and 0 dB.

Besides the original dataset having around 30 dB SNR, the present disclosure considers four additional SNR levels for time-series signal-based classification ranging from 0 dB to 20 dB and seven different additional SNR levels for spectrogram-based classification ranging from −10 dB to 20 dB, with increments of 5 dB in both cases. In general, spectrograms reflect the power spectral densities of the signals. Since color depth preserves distinctive information, the images are kept in an RGB format. However, this is not necessarily the case for time-series plots. In order to decrease the complexity, time-series signal images may be converted to greyscale (as illustrated in FIG. 1). In various embodiments, the spectrogram images are denoised subject to a certain threshold level to improve the learning of an exemplary model (as also illustrated in FIG. 1).

Denoising is an important step of the whole procedure. In accordance with certain embodiments of the present disclosure, denoising is applied only on spectrograms. In various embodiments, the present disclosure calculates the power spectral densities for equally spaced 257 different frequencies from 0 to 10 GHz at 23214 points in the time axis that corresponds to 250 μs. These calculated power spectral densities of original signals vary roughly from −130 to 5 dB/Hz and their values are mapped to three numbers in the [0-255] range, representing red, green, and blue channels. As such, minimum and maximum spectral densities are mapped to the coolest and warmest colors of a chosen color map, and intermediate values are placed accordingly. In order to denoise the spectrogram, a cut-off density is picked and the elements of the spectral density array that are smaller than this cut-off are set to the cut-off density itself, which assures signal components with smaller densities to be cleared. The rest of the signal is mapped to the same color range, which increases the level of representation of the details. As a result, non-noise RF signal components come forward that help the CNN models learn better.

Figure 5:
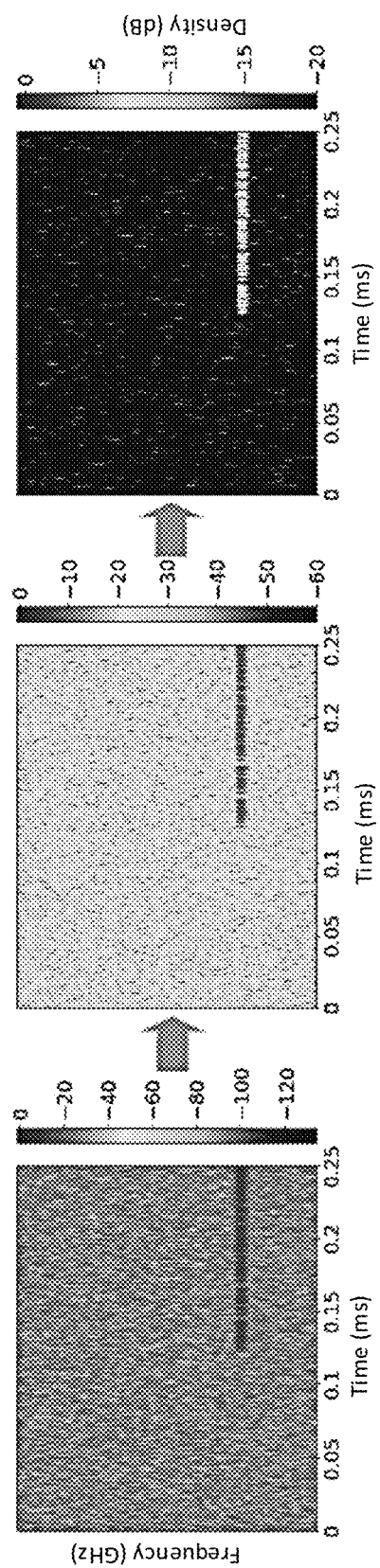
FIG. 5 shows spectrograms of a UAV controller (DJI Inspire 1 Pro controller) 0 dB SNR signal at different denoising threshold or cut-off values (from left to right): no denoising, −60 dB, −20 dB.

It is noted that there exists a trade-off with the chosen cut-off threshold. Depending on the SNR level of the signal in hand, spectrograms should be denoised at an optimum level, such that in case of underdenoising, excess noise causes overfitting and in case of overdenoising, useful information is wiped out together with the noise, which yields to underfitting. FIG. 5 shows spectrograms of a UAV controller (DJI Inspire 1 Pro controller) 0 dB SNR signal at different denoising threshold or cut-off values (from left to right): no denoising, −60 dB, −20 dB.

In various embodiments, before feeding the CNN, the images are chopped appropriately (as illustrated in FIG. 1) to get rid of the unnecessary parts of the images to reduce the file sizes, which will speed up the CNN model to converge. Spectrogram and time-series signal images have the sizes of (90×385×3) and (779×769×1) before feeding the CNN, respectively.

In the present disclosure, two approaches are examined while working with the spectrograms. In the first approach, eight different CNN models are created and optimized for each SNR level given above. Assuming that we can measure the captured signal's SNR, the CNN classification model having the closest SNR is selected to do the classification. Alternatively, if the SNR is unable to be measured, a CNN classification model is selected that has been trained on RF spectrograms of several different SNR ratios. In the second approach, taking into account that −10 dB/Hz cut-off value is the best trade-off (i.e., minimum average validation loss among all different cut-offs), all the images of different SNR levels at −10 dB/Hz threshold level are merged to create a new dataset, that is then used to train a CNN. The major advantage of the second approach is that it is no longer required to determine the SNR of the signal in advance.

Figure 6:
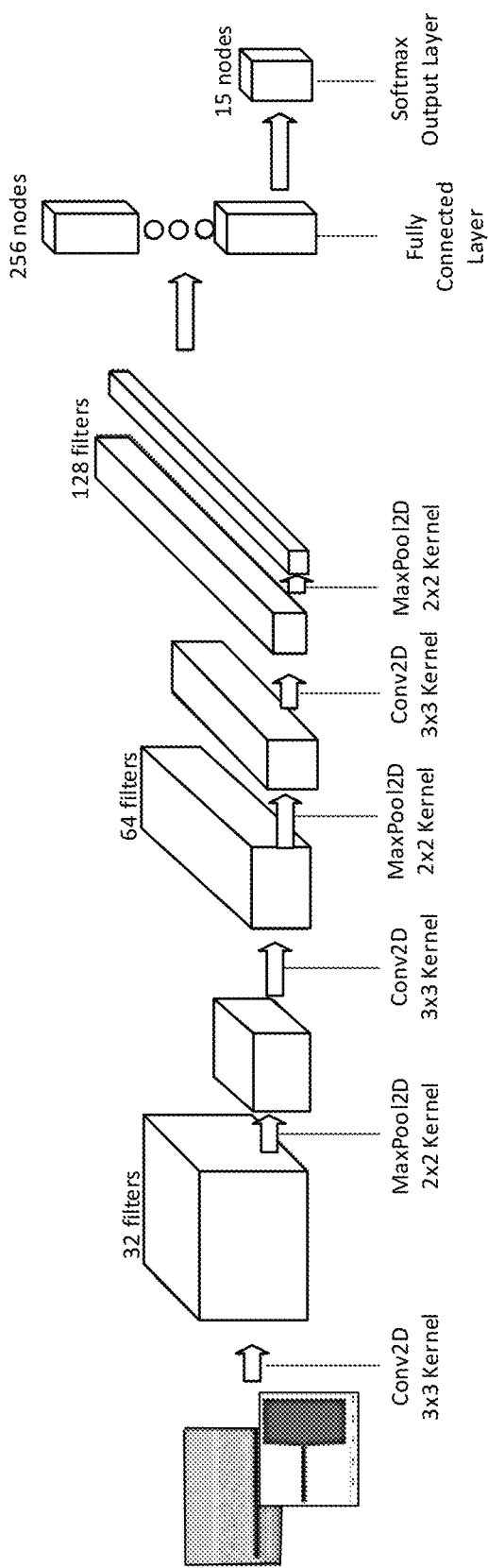
FIG. 6 is a diagram of convolutional neural network (CNN) architecture formed of three convolution and pooling layer pairs followed by a fully connected and a softmax output layer in accordance with various embodiments of the present disclosure.

Regarding CNN model training, CNNs have layers just as any other neural network architectures; however, different from other deep learning algorithms, convolution layers are used to apply various filters to an image to extract features no matter at which part of the image they reside. In the present disclosure, CNNs are trained using Keras with Tensorflow backend. An illustration of the model structure is shown in FIG. 6. In the models created, there are three convolution layers (Conv2D) followed by pooling layers (MaxPool2D) and then a fully connected layer followed by the output layer. Convolution layers get deeper (i.e., the number of filters increase) and size of the images get smaller as the data travels deep into the model, in accordance with the general convention. The CNN models have been trained and tested with a 3:1 ratio for each UAV class. Optimum hyperparameters are defined after running vast amount of simulations.

While training the models, categorical cross-entropy function is used as the loss function, in which this function gets smaller as true and predicted results get closer to each other. The aim of the model is to find the optimum set of model parameters to minimize the loss function.

To generate experimental results for time-series images and spectrograms, parallel simulations for different sets of hyperparameters were executed to find the optimum parameter set at the North Carolina State University HPC (High Performance Computing) Facility. FIG. 7 (Table II) summarizes the key optimum parameters for both models with time-series and spectrogram images and shows the classification accuracy. In order to train the models, 100 images were created for each class and for each unique SNR-denoising threshold pairs. Throughout the study, more than 100 datasets were created, each having 1500 images (15 classes with 100 images each).

For UAV classification using time-series images, the present disclosure optimizes five different CNNs for time-series images and observes that CNNs gather distinctive features from both the transient (i.e., the window where the noise-only region ends and the RF signal begins) and the envelope of the RF signal. As the signal swamps into noise as SNR decreases, first the transient information disappears whereas the information carried in the signal envelope survives a little longer. When the SNR is further decreased, envelope information also disappears. Thus, the validation accuracy drops from 99.7% to 50.1% as the SNR goes down from around 30 dB to 0 dB. Although different optimizers could give the maximum accuracy, all optimum models use a rectified linear unit (ReLu) as the activation function. Times-series images suffer from high noise more than spectrograms, since out-of-band noise distorts the signal as well as in-band noise.

For UAV classification using spectrogram images having CNN models with different SNR training sets, the present disclosure created eight models for eight different SNR levels that are denoised at their own optimum levels. To use this approach in the field, the SNR of the received signal may be calculated first, and then the model that has the closest SNR may be called to perform the classification. All of the models give their highest accuracies with the ReLu activation function. The sensitivity of the validation accuracy to a single output is 0.27% sample$^{-1}$; therefore, the only statistically different result belongs to SNR level −10 dB among individual sets. Performances of all the other models can be considered almost perfect.

It is observed from Table II (FIG. 7) that for different SNR levels, CNN gives the best accuracy at different cutoff points. For high SNRs (e.g., 30 dB and 20 dB), spectral densities of the signals are much higher than the noise; therefore, filtering out the image at different levels does not wipe out much information. Thus, the accuracy curve navigates flatter and the necessary cut-off threshold is low (−100 dB/Hz and −90 dB/Hz). At medium SNRs (e.g., 0-15 dB), a high level of denoising is required to preserve as much information as possible (all −10 dB/Hz). On the other hand, at low SNRs (e.g., −5 dB and −10 dB), without denoising the images, no learning occurs at all. CNNs begin to learn at high cut-offs, however not as high as for mid-SNRs, because overdenoising chops the meaningful information together with the noise. Therefore, optimum cut-off level slightly decreases again (−20 dB/Hz and −15 dB/Hz).

Figure 8:
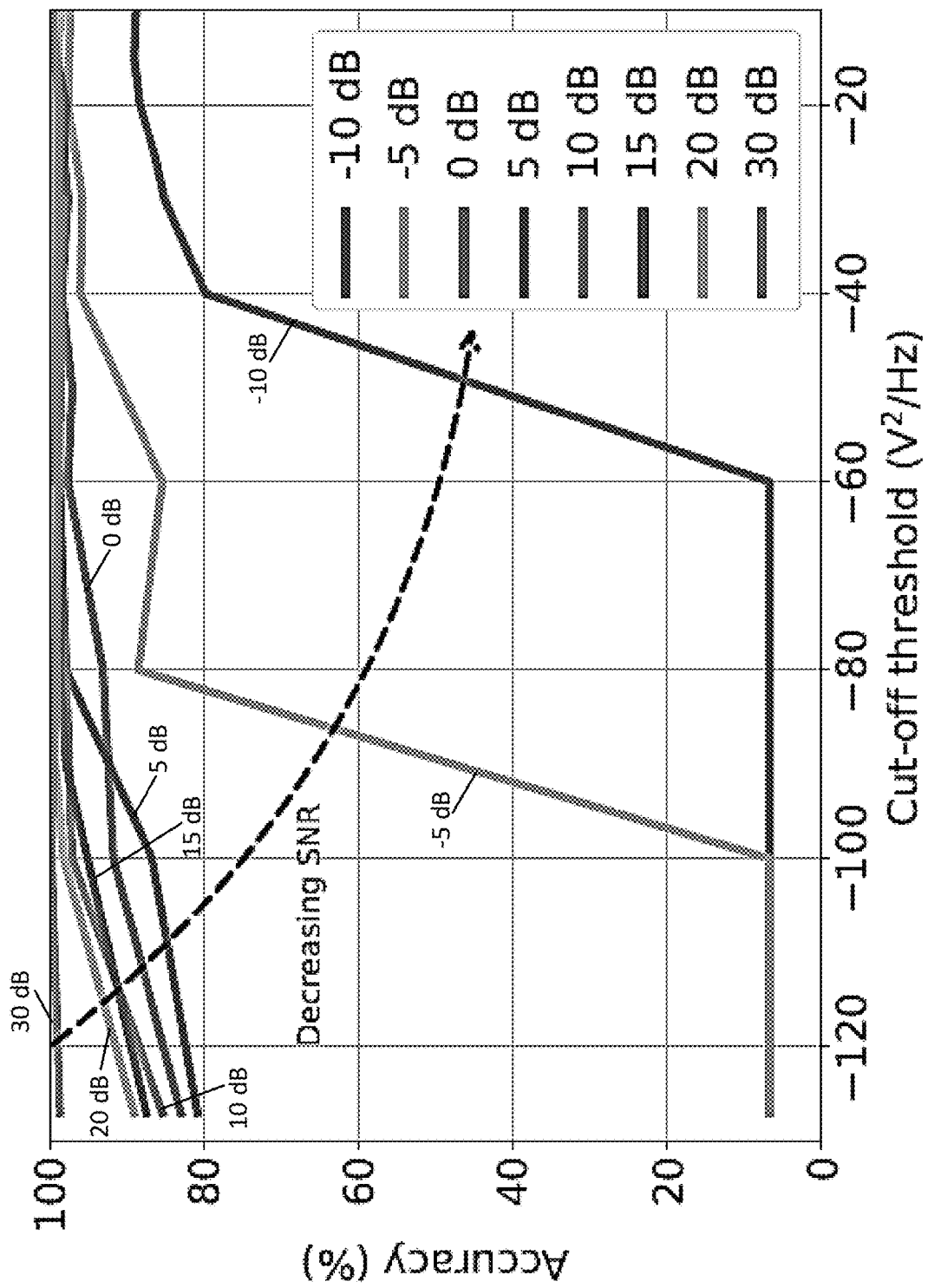
FIG. 8 is a plot of spectrogram model classification accuracy versus cut-off threshold for different SNR levels.

Performances of CNNs at different denoising thresholds for different SNR levels are given in FIG. 8. It is observed that the classification accuracy tends to increase with increasing levels of denoising. For lower SNRs (e.g., −5 dB and −10 dB), distinctive information in the spectrograms is swamped into noise so that any CNN gives a reasonable accuracy. The reported accuracy for these two SNR levels with no denoising is 6.66%. As the cut-off threshold increases, a reasonable accuracy is first acquired for −5 dB SNR dataset at the −80 dB/Hz threshold level. This amount of filtering is still not enough for −10 dB SNR, which only begins to learn at a comparably higher threshold of −40 dB/Hz. The advantage of using spectral domain information can be seen from the results of the 0 dB SNR model where the classification accuracy for time-series images is only 50.1%, whereas it is 82.9% for the spectrogram model at the same SNR level.

Although the CNN models trained with different single-SNR data sets give very good results, this approach comes with a practical difficulty. We can use these models only if the SNR of a received signal can be measured prior to classification. In order to eliminate this requirement and also to save time, the training sets of different SNR levels can be merged to create a more generalized model. The denoising cut-off that gives the smallest average loss is found to be −10 dB/Hz; therefore, all the images are merged for eight SNR levels with this cut-off threshold. As a result, training and test sets are eight times greater than those of the single SNR sets. To use this approach in the field, the received signal may be denoised with this cut-off, and then the model may be called to do the classification. A classification accuracy of 98.8% is achieved when using this exemplary CNN classification model.

The single merged model was also tested with images at intermediate SNR levels ranging from −12 dB to 22 dB with increments of 5 dB. 30 images for each class at each SNR were used, which added up to 3600 images, all previously unseen to the classifier. Using the intermediate SNR dataset, an exemplary CNN classification model is able to give 96.9% accuracy. In case that we exclude the test data at −12 dB, accuracy of the model increases up to 99.3%, which indicates that, almost all the misclassification is associated with this particular SNR level.

Several approaches are presented in the present disclosure for training CNNs to classify 15 drones of different makes and models using their controller RF signals for a wide variety of SNRs. The present disclosure artificially introduced noise to the raw data to obtain RF signals with different SNR levels and trained the CNN models using these signals' time-series images and/or spectrogram images. It is shown that spectrogram-trained models perform better than the time-series image-trained models. The present disclosure also introduced a denoising mechanism for the spectrogram images to further increase the classification accuracy. An exemplary method with the described training approach and denoising mechanism has been proven to be effective for the UAV classification task even at very low SNRs. It is also shown that the single merged CNN classification model is very accurate in classifying the controller RF signals with SNRs that are not used during training.

Advantages of exemplary techniques of the present disclosure include that such techniques are cost effective given that drone detectors/avoidance equipment are expensive compared to drone prices and are capable of operating on mobile platforms, where current counter-unmanned aircraft system products in the market are designed to operate at stationary points. Such techniques can classify the make and model of drones in noisy environments, as low as −5 dB SNR, with almost perfect accuracy. The validation accuracy that is reached is better than any other work in the literature, hence any other product in the market, to the best of the inventors' knowledge. Since the SNR of a signal decreases as the signal source gets away from the antenna, being able to work at low SNRs yields to increased range of a detection/classification. Also, techniques of the present disclosure can process both remote ID field data and remote ID information jointly to make a threat assessment. An exemplary framework/apparatus of the present disclosure can be instrumental for unmanned aerial vehicle traffic management (UTM) and urban air mobility (UAM), both of which are key emerging areas for effective integration of aerial vehicles to national air space (NAS). Techniques of the present disclosure can utilize localization as well as detect-and-avoid features to support UTM and UAM operations. Such techniques can beneficially impact UAV applications such as delivery, public safety, infrastructure inspection, safe operations during disaster and pandemic (such as COVID-19), among others. Further, techniques of the present disclosure can be attached/deployed in buildings and vehicles, unlike existing sophisticated products, and will require minimal training for the end user.

Figure 9:
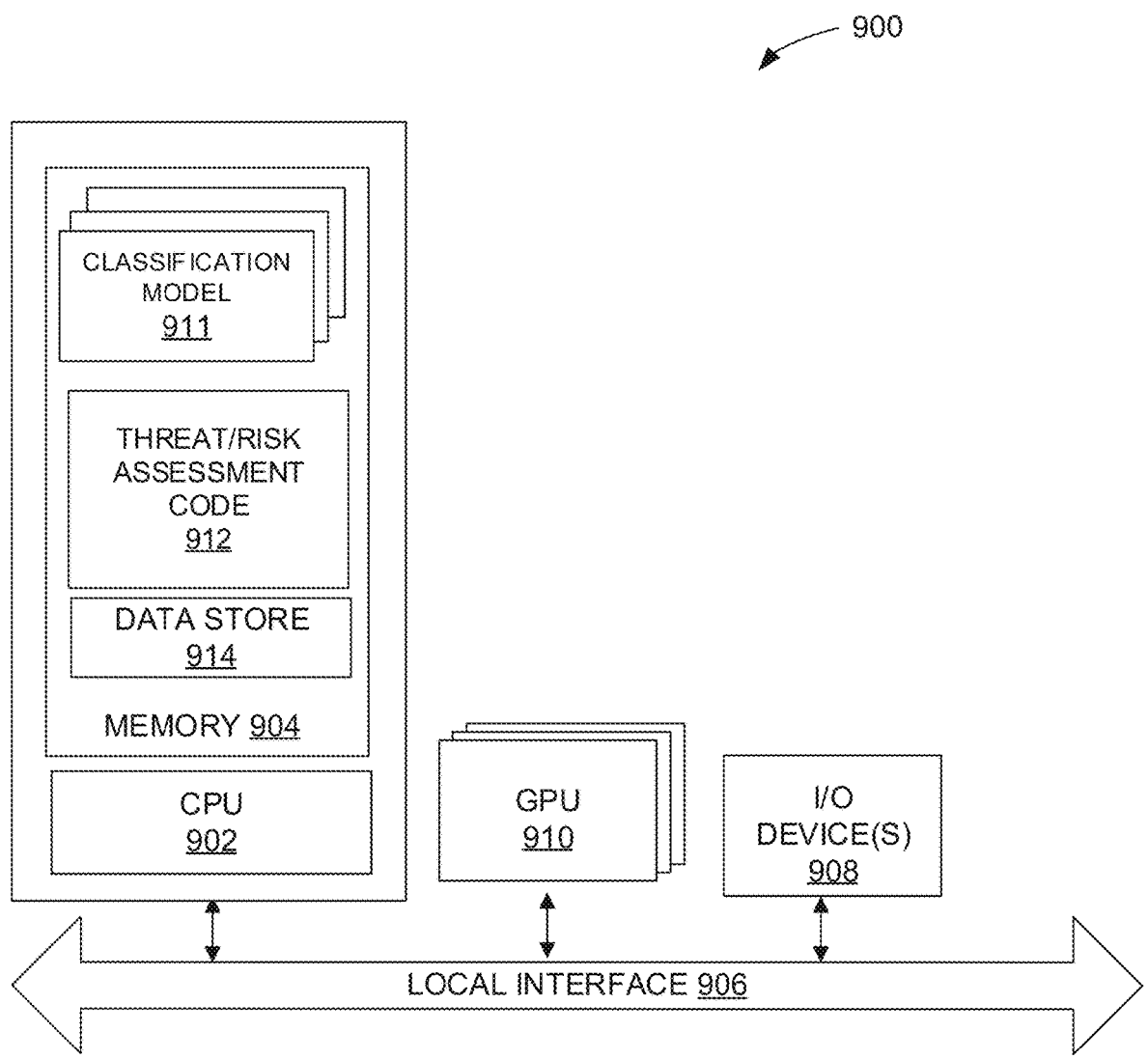
FIG. 9 depicts a schematic block diagram of a computing device that can be used to implement various embodiments of the present disclosure.

FIG. 9 depicts a schematic block diagram of computing device(s) 900 that can be used to implement various embodiments of the present disclosure. In various embodiments, the one or more computing devices 900 may be a local computer or a cloud/edge computing solution. An exemplary computing device 900 includes at least one processor circuit, for example, having a processor 902 and a memory 904, both of which are coupled to a local interface 906, and one or more input and output (I/O) devices 908. The local interface 906 may comprise, for example, a data bus with an accompanying address/control bus or other bus structure as can be appreciated. The computing device 900 further includes Graphical Processing Unit(s) (GPU) 910 that are coupled to the local interface 906 and may utilize memory 904 and/or may have its own dedicated memory. The CPU and/or GPU(s) can perform various operations such as image enhancement, graphics rendering, image/video processing, recognition (e.g., text recognition, object recognition, feature recognition, etc.), image stabilization, machine learning, filtering, image classification, and any of the various operations described herein.

Stored in the memory 904 are both data and several components that are executable by the processor 902. In particular, stored in the memory 904 and executable by the processor 902 are code for implementing one or more classification models 911 (e.g., artificial and/or convolutional neural network models 140) and/or UAV threat or risk assessment algorithms or code 912 in accordance with embodiments of the present disclosure. Also stored in the memory 904 may be a data store 914 and other data. The data store 914 can include an image database and potentially other data related to the computations performed by the classification models 911 and/or the threat/risk assessment code 912. In addition, an operating system may be stored in the memory 904 and executable by the processor 902. The I/O devices 908 may include input devices, for example but not limited to, a keyboard, mouse, etc. Furthermore, the I/O devices 908 may also include output devices, for example but not limited to, a printer, display, etc.

Embodiments of the present disclosure can be implemented in hardware, software, firmware, or a combination thereof. In an exemplary embodiment, categorization/assessment logic or functionality is implemented in software or firmware that is stored in a memory and that is executed by a suitable instruction execution system. If implemented in hardware, as in an alternative embodiment, classification/assessment logic or functionality can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It should be emphasized that the above-described embodiments are merely possible examples of implementations, merely set forth for a clear understanding of the principles of the present disclosure. Many variations and modifications may be made to the above-described embodiment(s) without departing substantially from the principles of the present disclosure. All such modifications and variations are intended to be included herein within the scope of this disclosure.

Therefore, at least the following is claimed:

1. A method comprising:
   detecting, by one or more computing devices, a radio frequency (RF) signal;
   determining, by the one or more computing devices, that the RF signal is generated from an unmanned aerial vehicle (UAV) based on the detected RF signal;
   obtaining, by the one or more computing devices, a color spectrogram image of the detected RF signal;
   classifying, by the one or more computing devices, at least a make and model of the UAV based on the color spectrogram image of the detected RF signal;

sensing, by the one or more computing devices, for a remote identification field data broadcasted by the UAV;

receiving, by the one or more computing devices, remote identification information of the UAV from a network database, if the network database is available;

assessing, by the one or more computing devices, a threat likelihood of the UAV based on joint processing of at least the color spectrogram image-based classification of the UAV and the received remote identification information of the UAV; and signaling, by the one or more computing devices, an alert containing a description of the UAV and the threat if the UAV is assessed as a harmful threat.

2. The method of claim 1, wherein the remote identification information is compared with the color spectrogram image-based classification in assessing the threat likelihood of the UAV.

3. The method of claim 2, wherein the threat likelihood of the UAV is assessed utilizing multiple data sources comprising audiovisual and radar signals gathered from the field in addition to the RF signals and the received remote identification information of the UAV.

4. The method of claim 1, wherein the description of the threat provides a target location, wherein the target location comprises aerial vehicle corridors or particular buildings.

5. The method of claim 1, further comprising determining a location, speed, or direction of travel of the UAV, wherein the description of the UAV includes the location, speed, or the direction of travel of the UAV.

6. The method of claim 1, further comprising training classification models deployed on the one or more computing devices on RF spectrograms of different UAV RF signals.

7. The method of claim 6, further comprising denoising the RF spectrograms before using the RF spectrograms to train the classification models deployed on the one or more computing devices.

8. The method of claim 7, further comprising using artificial intelligence techniques for at least the classifying and assessing operations.

9. The method of claim 6, further comprising measuring a signal to noise ratio (SNR) of the detected RF signal and selecting one or more individual ones of the classification models deployed on the one or more computing devices that have been trained on RF spectrograms having the measured SNR.

10. The method of claim 6, wherein the RF spectrograms have different signal to noise ratios.

11. A system comprising:
a processor of a computing device; and
memory configured to communicate with the processor, the memory having instructions stored thereon that, in response to execution by the processor, cause the computing device to perform operations comprising:
detecting a radio frequency (RF) signal;
determining that the RF signal is generated from an unmanned aerial vehicle (UAV) based on the detected RF signal;
obtaining a color spectrogram image of the detected RF signal;
classifying at least a make and model of the UAV based on the color spectrogram image of the detected RF signal;
sensing for a remote identification field data broadcasted by the UAV;
receiving remote identification information of the UAV from a network database if the network database is available;
assessing a threat likelihood of the UAV based on joint processing of at least the color spectrogram image-based classification of the UAV and the received remote identification information of the UAV; and
signaling an alert containing a description of the UAV and the threat if the UAV if the UAV is assessed as a harmful threat.

12. The system of claim 11, wherein the operations further comprise training classification models on RF spectrograms of different UAV controller RF signals.

13. The system of claim 12, wherein the operations further comprise denoising the RF spectrograms before using the RF spectrograms to train the classification models.

14. The system of claim 13, wherein the operations further comprise using artificial intelligence techniques for at least the classifying and assessing operations.

15. The system of claim 12, wherein the operations further comprise obtaining a signal to noise ratio (SNR) of the detected RF signal and selecting one or more individual ones of the classification models that have been trained on RF spectrograms having the measured SNR.

16. The system of claim 12, wherein the operations further comprise obtaining a signal to noise ratio (SNR) of the detected RF signal and selecting one or more individual ones of the classification models that have been trained on RF spectrograms of different SNR ratios.

17. A non-transitory computer-readable storage medium having instructions stored thereon that, in response to execution by a computer-based system, cause the computer-based system to perform operations comprising:
detecting a radio frequency (RF) signal;
determining that the RF signal is generated from an unmanned aerial vehicle (UAV) based on the detected RF signal;
obtaining a color spectrogram image of the detected RF signal;
classifying at least a make and model of the UAV based on the color spectrogram image of the detected RF signal;
obtaining a remote identification field data broadcasted by the UAV;
receiving remote identification information of the UAV from a network database if the network database is available;
assessing a threat likelihood of the UAV based on joint processing of at least the color spectrogram image-based classification of the UAV and the received remote identification information of the UAV; and
signaling an alert containing a description of the UAV and the threat if the UAV if the UAV is assessed as a harmful threat.

18. The non-transitory computer-readable storage medium of claim 17, wherein the operations further comprises training classification models on RF spectrograms of different UAV RF signals, wherein the RF spectrograms have different signal to noise ratios.

19. The non-transitory computer-readable storage medium of claim 18, wherein the operations further comprise denoising the RF spectrograms before using the RF spectrograms to train the classification models.

20. The method of claim 6, further comprising measuring a signal to noise ratio (SNR) of the detected RF signal and selecting one or more individual ones of the classification models deployed on the one or more computing devices that have been trained on RF spectrograms of different SNR ratios.

* * * * *